United States Patent
Förster (10) Patent No.: US 7,699,148 B2
(45) Date of Patent: Apr. 20, 2010

(54) DAMPING VALVE ASSEMBLY WITH A PROGRESSIVE DAMPING FORCE CHARACTERISTIC

(75) Inventor: Andreas Förster, Schweinfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 642 days.

(21) Appl. No.: 11/001,470

(22) Filed: Dec. 1, 2004

(65) Prior Publication Data
US 2005/0115786 A1 Jun. 2, 2005

(30) Foreign Application Priority Data
Dec. 1, 2003 (DE) .................. 103 56 639
Oct. 19, 2004 (DE) .................. 10 2004 050 732

(51) Int. Cl.
*F16F 9/34* (2006.01)
*F16F 9/36* (2006.01)

(52) U.S. Cl. ............. 188/322.13; 188/316; 137/625.12

(58) Field of Classification Search ............ 188/322.13, 188/322.14, 322.15, 322.18, 316, 317; 137/625.12, 137/625.13
See application file for complete search history.

(56) References Cited

U.S. PATENT DOCUMENTS

| | | | | |
|---|---|---|---|---|
| 4,401,196 A | * | 8/1983 | Grundei | 188/282.6 |
| 4,474,271 A | * | 10/1984 | Molders et al. | 188/280 |
| 4,782,925 A | | 11/1988 | Grundei | |
| 5,042,625 A | | 8/1991 | Maus | |
| 5,261,448 A | | 11/1993 | Furuya et al. | |
| 5,823,306 A | * | 10/1998 | de Molina | 188/322.15 |
| 6,220,409 B1 | | 4/2001 | Deferme | |
| 2002/0027051 A1 | * | 3/2002 | Grundei | 188/322.15 |
| 2003/0173167 A1 | * | 9/2003 | Nandyal | 188/282.1 |
| 2005/0045440 A1 | * | 3/2005 | Kock et al. | 188/322.15 |
| 2006/0011432 A1 | * | 1/2006 | Turner | 188/322.15 |

FOREIGN PATENT DOCUMENTS

| | | |
|---|---|---|
| DE | 27 21 933 | 11/1978 |
| DE | 31 07 517 | 12/1981 |
| DE | 35 33 386 | 3/1987 |
| DE | 36 02 224 | 7/1987 |
| DE | 39 23 512 | 1/1991 |
| DE | 40 36 613 | 5/1991 |
| DE | 42 38 728 | 5/1994 |
| DE | 100 22 029 | 11/2000 |
| FR | 2 070 461 | 9/1971 |
| GB | 2070730 | 9/1981 |
| JP | 5288233 | * 11/1993 |
| WO | WO 00/52354 | 9/2000 |

* cited by examiner

*Primary Examiner*—Melody M Burch
(74) *Attorney, Agent, or Firm*—Cohen Pontani Lieberman & Pavane LLP (57) ABSTRACT

Damping valve assembly includes a first damping valve, which, in a first operating range, opens as the flow velocity of the damping medium increases, where a second operating range with a progressive damping force characteristic is influenced by a throttle in conjunction with a control slide, which can be moved into a closed position. The control slide has a pressure-actuated surface, which, as a function of the flow velocity of the damping medium, acts in the closing direction on the control slide.

7 Claims, 5 Drawing Sheets

DAMPING VALVE ASSEMBLY WITH A PROGRESSIVE DAMPING FORCE CHARACTERISTIC

BACKGROUND OF THE INVENTION

1. Field of the Invention

The invention pertains to a damping valve assembly for a vibration damper having a piston which moves in a damping medium in a cylinder, the assembly including a first damping valve which, in a first operating range, opens as the flow velocity of the damping medium increases; and a first control slide which, in a second operating range with a progressive damping characteristic, can move in a closing direction to close a throttle.

2. Description of the Related Art

DE 35 33 386 A1 describes a two-tube vibration damper, the piston of which carries a compression spring. The spring moves a control slide on a bottom valve into a closed position as a function of the stroke of the piston to produce a progressive damping force characteristic shortly before the end of the stroke. In a vehicle being driven at comparatively high speed over a section of bad road, it is possible for a wheel to move inward very abruptly and to be braked along the further course of its inward travel by the maximum damping force available, which is determined by a set of valve disks on the bottom valve. If the stop spring then meets the control slide on the bottom valve side of the damper, only a comparatively small amount of residual stroke is left to absorb the energy of the inward-traveling wheel. It is possible for the area of the vehicle body connected to the vibration damper to be affected by this unabsorbed force.

What appears to be the simplest possibility at first glance is simply to reinforce the vehicle body in the endangered area, but this would make it necessary to accept a considerable increase in weight.

Another disadvantage of this principle is that the stop spring on the piston side causes a real loss of stroke. In this context, DE 36 02 224 A2 should also be mentioned, which describes the same operative principle.

GB 2,070,730 discloses a vibration damper, which has a damping valve device with two valves, which are connected hydraulically in parallel. A first damping valve comprises a throttle cross section, which, as the speed of the piston rod increases, is reduced in size by a valve body, e.g., an elastic disk, as a function of the speed of the piston rod, so that a progressive damping force characteristic is obtained. If the load becomes excessive, a pressure-relief valve, which connects the two working spaces of the vibration damper to each other, can go into effect. Various problems occur in practice when the solution according to DE 31 07 517 A1 is used. For example, the damping force is very small at comparatively low speeds and then increases parabolically, so that, as the vehicle is being driven, a more-or-less spongy and imprecise feeling is conveyed. Even at low speeds, it is desirable to perceive a certain measure of damping force. When the piston rod travels at an intermediate speed, the damping force should follow a degressive or linear characteristic and should not show a progressive damping force behavior until very high piston speeds. A damping force characteristic of this type can be achieved with a small pilot cross section, which in many cases remains open at all times, to which a spring-preloaded damping valve is connected hydraulically in parallel, which opens only after the speed of the piston exceeds a certain defined value.

SUMMARY OF THE INVENTION

The task of the present invention is to realize a damping valve device which has a damping force characteristic with a progressively rising component, but which, in a range corresponding to normal driving conditions, follows a damping force curve which is suitable to the vehicle.

According to the invention, the control slide has a pressure-actuated surface, which acts in the closing direction on the control slide as a function of the flow velocity of the damping medium.

The great advantage of the invention is that a conventional damping valve can be used as a basis, that is, a valve with a damping force characteristic which is adjusted for normal driving conditions and which does justice to the claims of both comfort and safety. Through the use of the control slide, it is also possible to obtain, at high piston velocities, a damping force characteristic which is independent of the instantaneous level of the wheel and also independent of the range of the damping force characteristic provided to cover normal driving conditions, with the result that there is no sacrifice of comfort under any conditions.

It is also provided that, with respect to the flow path of the damping medium, the control slide is installed in series with the damping valve. The inflow or outflow of damping medium is closed off at the damping valve in order to achieve an overall increase in the damping force.

In a further elaboration of the invention, the pressure actuated surface of the control slide is adjacent to a throttle point, which leads to the first damping valve assembly. Thus a space-saving design of the overall damping valve can be achieved.

Thus the throttle point is determined by the outside diameter of the control slide and possibly by an inside wall of the cylinder of the vibration damper. This arrangement allows the use of very simple control slide components, because in most cases the cylinder is already manufactured as a precision component.

To ensure that the control slide operates in a defined manner, it is held in the open position by a spring.

To protect not only the damping valve device itself but also the vibration damper in which the damping valve device is installed, the throttle point is connected in parallel to a pressure-limiting valve. As a result, it is possible to limit the achievable damping force of the damping valve to a defined value.

In a design variant, the pressure-limiting valve is formed by a spring disk assembly, which also holds the control slide in the open position. Overall, a very flat (axially short) unit is obtained.

Alternatively, the control slide is held in the open position independently of the pretensioning force acting on the pressure-limiting valve. This variant makes it possible to control the shape of the damping force characteristic with greater freedom.

For this purpose, the control slide is supported so that it can slide relative to the valve disk of the pressure-limiting valve. To save space, the valve disk of the pressure-limiting valve is coaxial to the control slide.

In a further design elaboration, the control slide, when in the open position, is supported axially against the valve disk of the pressure-limiting valve.

According to an advantageous subclaim, the damping valve device is installed on the piston of the vibration damper. If the inventive damping valve were to be designed, for example, as the bottom valve of a vibration damper, then only the volume displaced by an inward-traveling piston rod would be available to produce the damping force. But if the inventive damping valve is provided in the piston to act during, for example, the piston's inward travel, it would then be possible under certain conditions for the damping medium volume of the entire displaced cylinder cross section to be used to produce the damping force. Although cavitation can occur in the enlarged space, such cases are likely to be rare and can be tolerated.

During operation, the control slide influences both the inflow and outflow of damping medium at the piston.

So that components which are as close as possible to standard production parts can be used for the first assembly of the damping valve, a spring carrier is provided to accept the spring which holds the control slide in the open position.

The control slide is supported against the nut of the piston. The overall length of the piston is not increased by the inventive damping valve.

So that the damping force characteristic for the normal operation of the damping valve can be adjusted more effectively, the spring which holds the control slide in the open position is designed independently of the valve spring which pretensions the valve body of the first damping valve assembly of the piston-side damping valve.

The valve spring for the first assembly of the damping valve clamps the assembly comprising the control slide to the damping valve. The spring carrier for the spring of the control slide can be peened firmly against or welded to the piston nut, for example. At the same time, the elastic force of the valve spring usually tends to be strong enough to be able to pretension the spring carrier against the piston nut even in opposition to the force of the spring acting on the control slide.

For manufacturing reasons, it is advantageous, especially for the sake of keeping the production line moving smoothly, to use components which have been prefabricated as far as possible. For this reason, the piston nut, the spring carrier, and the control slide are clamped together to form a single unit.

A support ring, on which the control slide is axially supported, can also be added to this unit. This helps to prevent the control slide from tilting when it is in the open position.

According to an advantageous subclaim, the support ring is connected in a torque-transmitting manner to the piston nut and is designed with flats which a torque wrench can grip. The nut is threaded so that it can be fastened to the piston rod, but the lateral surface, which is usually designed with a hexagonal profile, is covered by the spring carrier and the control slide. With the new variant, the piston nut can be screwed in by turning the support ring.

Overall, the damping valve must be manufactured very precisely in order to obtain the desired effect. So that unavoidable manufacturing tolerances will not impair the proper operation of the valve, the valve body has a plastically deformable adjusting area.

The adjusting area of the valve body is formed by an area of reduced wall thickness. During the production process, the control slide is pretensioned into the closed position under controlled conditions. The control slide will undergo a certain amount of deformation as a function of the prevailing manufacturing tolerances, and the open cross section of the throttle point can thus be adjusted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figures 1, 2:
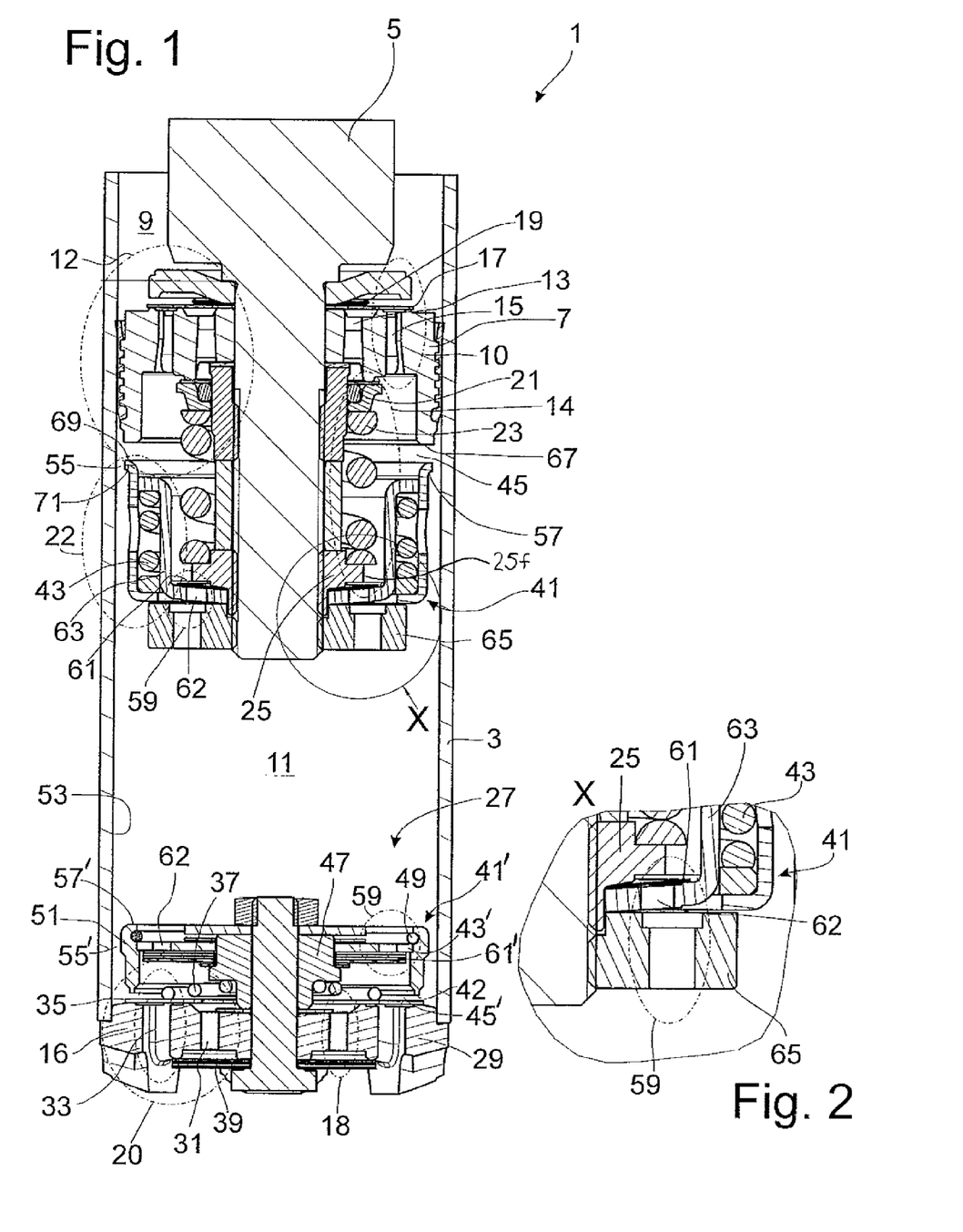
FIG. 1 shows a diagram of the inventive damping valve as a piston valve and as a bottom valve in a vibration damper.
FIG. 2 shows a diagram of a detail of a pressure-limiting valve.

FIG. 1 shows a part of a vibration damper 1, in the damping medium-filled cylinder 3 of which a piston rod 5, to which a piston 7 is fastened, is guided with freedom of axial movement. The piston 7 divides the cylinder 3 into a working space 9 on the piston-rod side of the piston and a working space 11 on the side of the piston away from the piston rod. Groups of open channels 13, 15 are provided in the piston for the two flow directions of the damping medium. For the inward travel direction of the piston into the cylinder, the first assembly 10 of the damping valve 12 comprises the open channels 15, the outlet ends of which are at least partially covered on the top surface of the piston 7 by at least one valve disk 17 in conjunction with a valve spring 19. In the case of a vibration damper according to the single-tube principle, this first assembly—open channels 15, valve disk 17, and valve spring 19—would determine the damping force characteristic for normal driving conditions. A very small, permanently open pilot cross section can be made inside the valve disk 17 or inside the valve seating surface on the top of the piston; this pilot cross section is active only at very low flow rates or piston velocities. Above a defined piston velocity, the valve disk 17 rises from the valve seating surface and releases the open channels 15.

For the damping in the outward-travel direction, the open channels 13 are available, which are located on a smaller pitch circle, and which are also at least partially covered by a valve body 21, which is pretensioned by a valve spring 23. The valve spring 23 is supported against a piston nut 25, which is screwed onto a pin extending from the piston rod. The parts just described form the second assembly 14 of the damping valve 12, where the assemblies 10, 14 of the damping valve 12 correspond to the standard type of damping valve used on a piston.

In the case of a vibration damper based on the single-tube principle, furthermore, it is possible to use a damping valve device in the form of a bottom valve 27, the valve body 29 of which also has two groups of open channels 31, 33 (in the case of a vibration damper according to the two-tube principle, this is standard practice). The open channels 33, which accommodate the inflow from a damping medium-filled space (not shown) on the bottom side of the valve body 29 into the working space 11 on the side away from the piston rod, are located on the larger pitch circle. These open channels 33 are usually covered by a simple check valve designed in the form of a disk 35 with a closing spring 37. The open channels 33, the disk 35, and the closing spring 37 form a first assembly 16 of the bottom valve 27. For the outflow from the working space 11 on the side away from the piston rod toward the bottom surface of the valve body 29, the valve body 29 has the open channels 31, which are covered by at least one elastic valve disk 39, where this combination is to be considered the second assembly 18 of the damping valve device 27. This design of a damping valve is also known.

During the inward travel of the piston rod, the volume of damping medium displaced by the piston rod 5 is displaced through the second assembly 18 of the bottom valve 27 and generates a damping force. The first and second assemblies 16, 18 correspond to the damping valve 12 on the piston, which opens as the flow velocity increases.

The damping valve device 27 designed as a bottom valve also has an axially movable control slide 41', the bottom end surface 42 of which can come to rest on the disk 35 of the check valve against the force of a spring 43' designed in the form of an elastic disk. The spring 43' holds the control slide 41' in the open position, the top surface of the disk 35 of the check valve and the bottom end surface 42 of the control slide 41' forming a first throttle point 45'.

A ring-shaped support body 47, permanently riveted to the valve body 29, accepts the inside diameter of the spring 43'; this support body 47 also supports the closing spring 37 of the check valve. The inside diameter of the spring 43' is peened over, for example, onto the support body 47 and is connected at its outside diameter by way of a lock ring 49, for example, to the control slide 41', so that the spring 43' is clamped without play.

The contour of the outside diameter of the control slide 41' has several graduations. A first shoulder 51 cooperates with the inside wall 53 of the cylinder to form a second throttle point 55', at which a considerable pressure drop is available for use. The axial dimension of the first shoulder is intentionally rather short in order to minimize temperature-based viscosity effects inside the second throttle point 55'. The end surface facing in the direction of the working space 11 on the side away from the piston rod can be used as a pressure-actuated surface 57', which acts in the closing direction on the control slide 41' as a function of the flow velocity inside the second throttle point 55'. The dimensions of the two throttle points 45', 55' are calculated in such a way that they do not exert any significant effect on the damping force characteristic of the overall damping valve within the normal operating range of the vibration damper.

When the flow velocity has reached a threshold value and the control slide 41' rests on the disk 35 of the check valve; so that the first throttle point 45' is closed, a pressure-limiting valve 59' connected in parallel to the first throttle point 45' can open. In this exemplary embodiment, the pressure-limiting valve 59' is formed by a spring disk assembly, namely, by the spring 43', which holds the control slide 41' in the open position, and by at least one cover disk 61' underneath the spring 43', where the spring 43' has at least one open cross section 62', which is closed by the cover disk 61' during the normal operation of the damping valve.

The essential point is that the closing movement of the control slide 41' depends exclusively on the flow velocity of the damping medium, that is, on the inward travel velocity of the piston 7, and thus can be exploited in any stroke position. Nor is there any need for the piston 7 to travel a certain pretensioning distance before the control slide 41' on the bottom damping valve 27 will close, which means that a very long effective stroke is available to produce the damping forces under emergency operating conditions.

The inventive damping valve device can be used on the piston rod 5, but even if this is done, it is still highly advisable to equip the bottom valve with a slide 41' as well. If the device is used on the piston rod, the control slide 41 is supported indirectly on the piston nut 25 and thus does not influence the flow of damping medium into the piston 7. In addition, the piston nut carries a spring carrier 63 with an S-shaped cross section, which accepts the spring 43, which pretensions the control slide 41 in the open direction. The spring 43 for the control disk 41 is therefore designed independently of the valve spring 23 for the valve body 21; the valve spring 23 can also clamp the assembly 22 including the control slide 41, namely, the assembly consisting of the spring carrier 63 together with the spring 43 and the control slide 41, to the piston nut 25, in which case it is also possible to use a support ring 65, if desired.

At a high-enough piston velocity, the pressure which builds up in the working space 11 on the side away from the piston rod and which thus acts on the pressure-actuated surface 57 of the control slide 41 on the piston is strong enough to move the slide against the force of the spring 43 toward the end surface 67 of the piston 7. The top surface of the circular ring-shaped edge 69 of the control slide 41 and the end surface 67 of the piston 7 form the first throttle point 45, and the outside diameter of the edge 71 cooperates with the inside wall 53 of the cylinder 3 to form the second throttle point 55. The pressure difference in the area of the second throttle point determines the closing behavior of the control slide 41.

As FIG. 2 shows, a pressure-limiting valve 59 can also be provided on the piston 7, parallel to the control slide 41; this valve can be formed by, for example, a cover disk 61, which covers the open cross section 62 in the spring carrier 63 in a directionally dependent manner.

When the damping valve device is used both on the piston and on the bottom valve, the slide on the bottom valve should assume a closed position at a lower flow velocity than the slide on the piston does, because then it will be impossible for the situation to occur in which the slide on the piston is closed while there is still a comparatively large cross section available at the bottom valve, as a result of which the volume from the working space on the side away from the piston rod would be pushed out through the bottom valve. This would allow damping force to be wasted.

Figure 3:
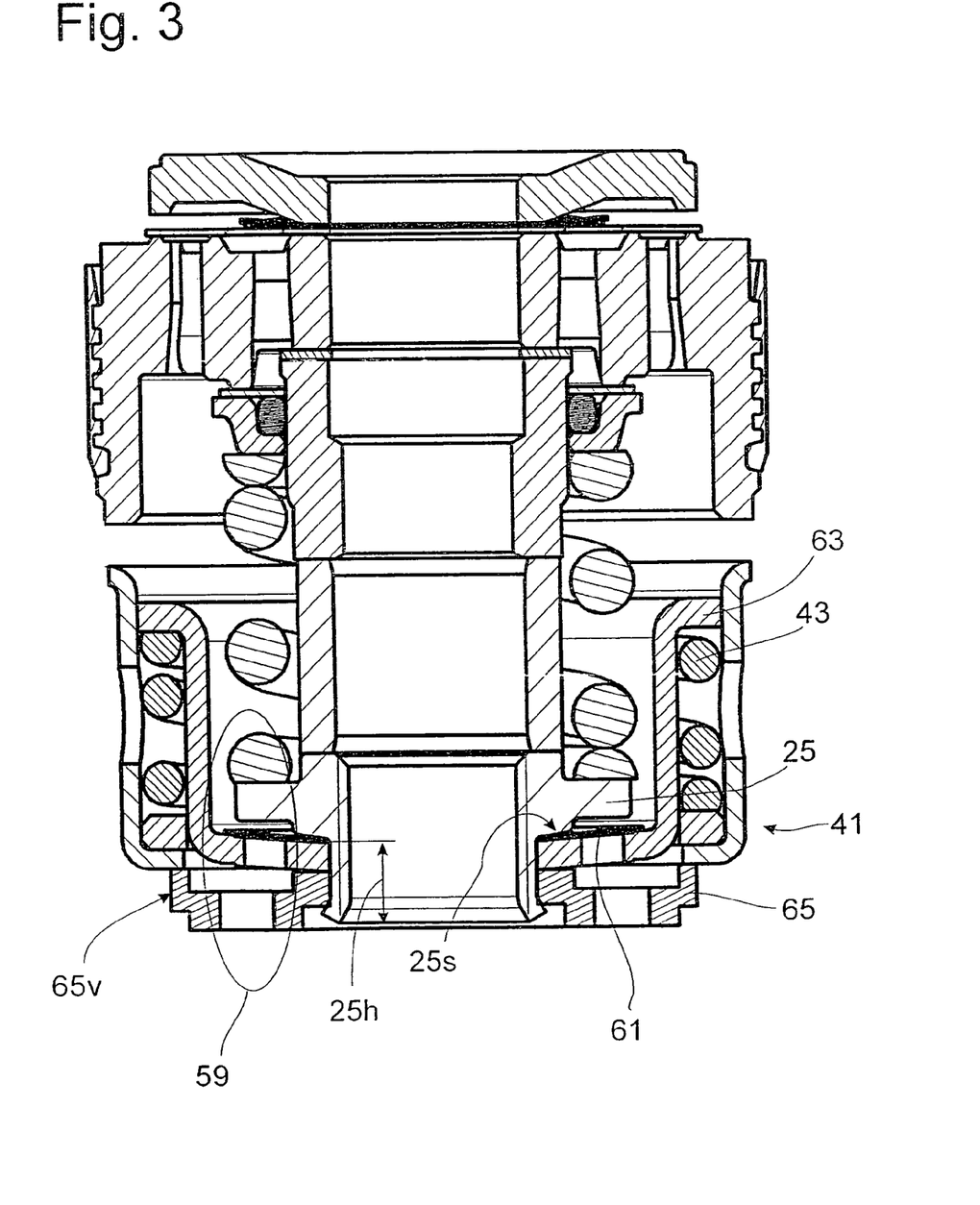
FIG. 3 shows a variant of a piston valve according to FIG. 1.

FIG. 3 shows a modification of the device according to FIG. 1. The difference is that here the piston nut 25, the spring carrier 63, the control slide 41, the spring 43, and the support ring 65 form a single structural unit. For this purpose, the piston nut has a support surface 25s, against which the cover disk 61 of the pressure-limiting valve 59 rests. The inside diameter of the support ring 65 is profiled, so that, upon the plastic deformation of a sleeve section 25h of the piston nut 25, having flats 25f, when the support ring is pushed onto it, a projecting edge of the sleeve is deformed onto the bottom surface of the support ring and into the profiling of the support ring, so that a torque-transmitting connection is established between the piston nut 25 and the support ring 65. On the outside circumference, the support ring is provided with flats 65v for a torque wrench, which make it easier to screw the structural unit onto the piston rod pin.

Figure 4:
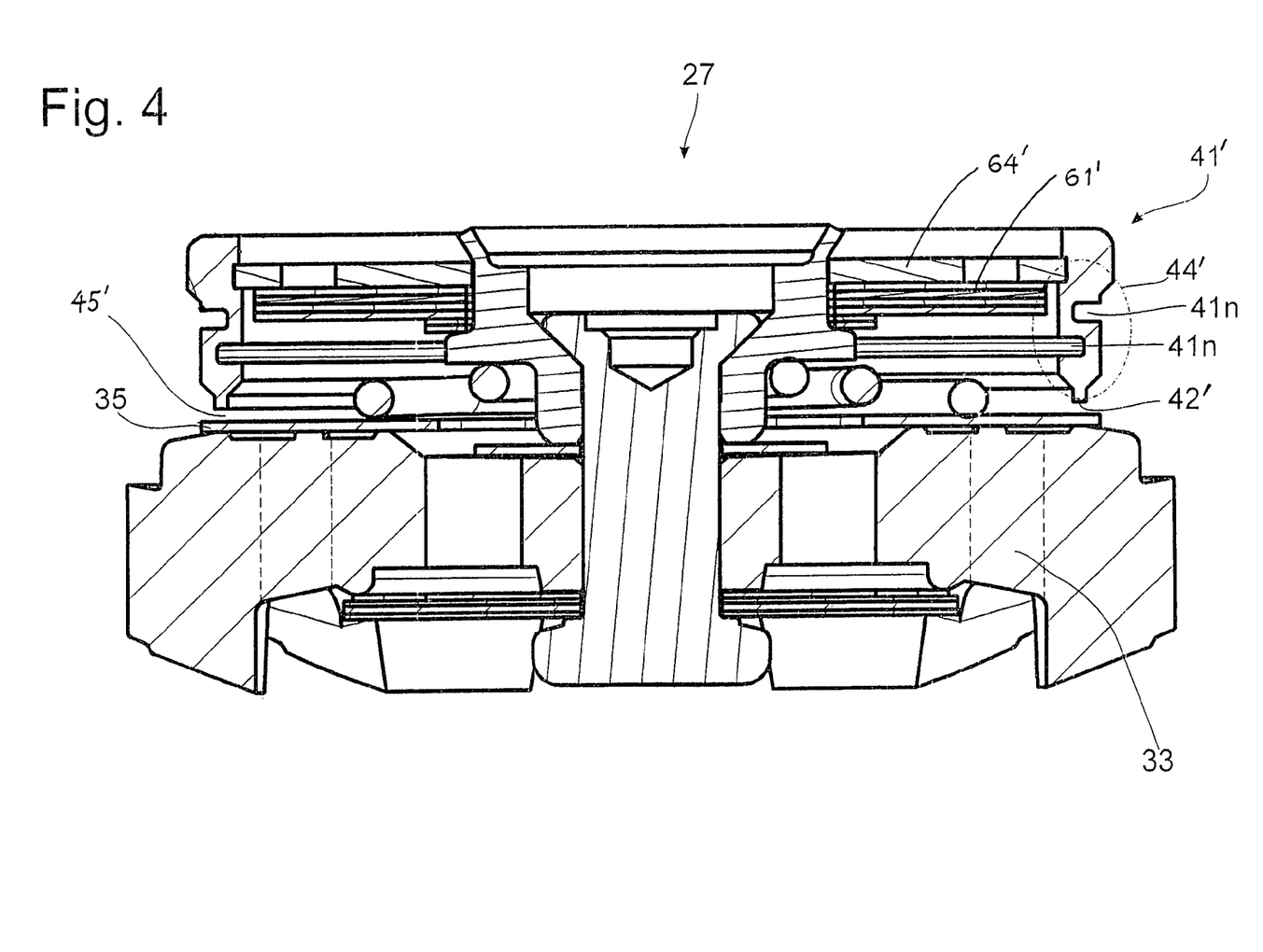
FIG. 4 shows a control slide with an adjusting area.

FIG. 4 contains, among other things, a modification of the control slide 41' inside the bottom valve 27. The ring-shaped control slide 41' is held by a valve disk 64' in combination with the elastic cover disks 61 in a defined open position. Height tolerances of the individual components in particular can cause the distance between the end surface 42' and the disk 35 for the open channels 33 not to have the required value, as a result of which the action of the throttle point 45' is changed. To minimize a defect of this type, the dimensions of the individual components are calculated so that this distance is always smaller than the nominal distance required for the correct adjustment of the throttle point 45'.

In the wall of the ring-shaped control slide 41', at least one circumferential groove 41n is machined into both the inside and outside diameters to produce an area of reduced wall thickness, which forms a plastically deformable adjusting area 44'. To adjust the throttle point, the control slide 41' is pressed down onto the top surface of the disk 35, as a result of which the control slide is plastically deformed in the axial direction, until the correct distance for the throttle point is present in the open position. By the use of this method, it is possible to correct any defects which may have caused the distance to be incorrect.

Figure 5:
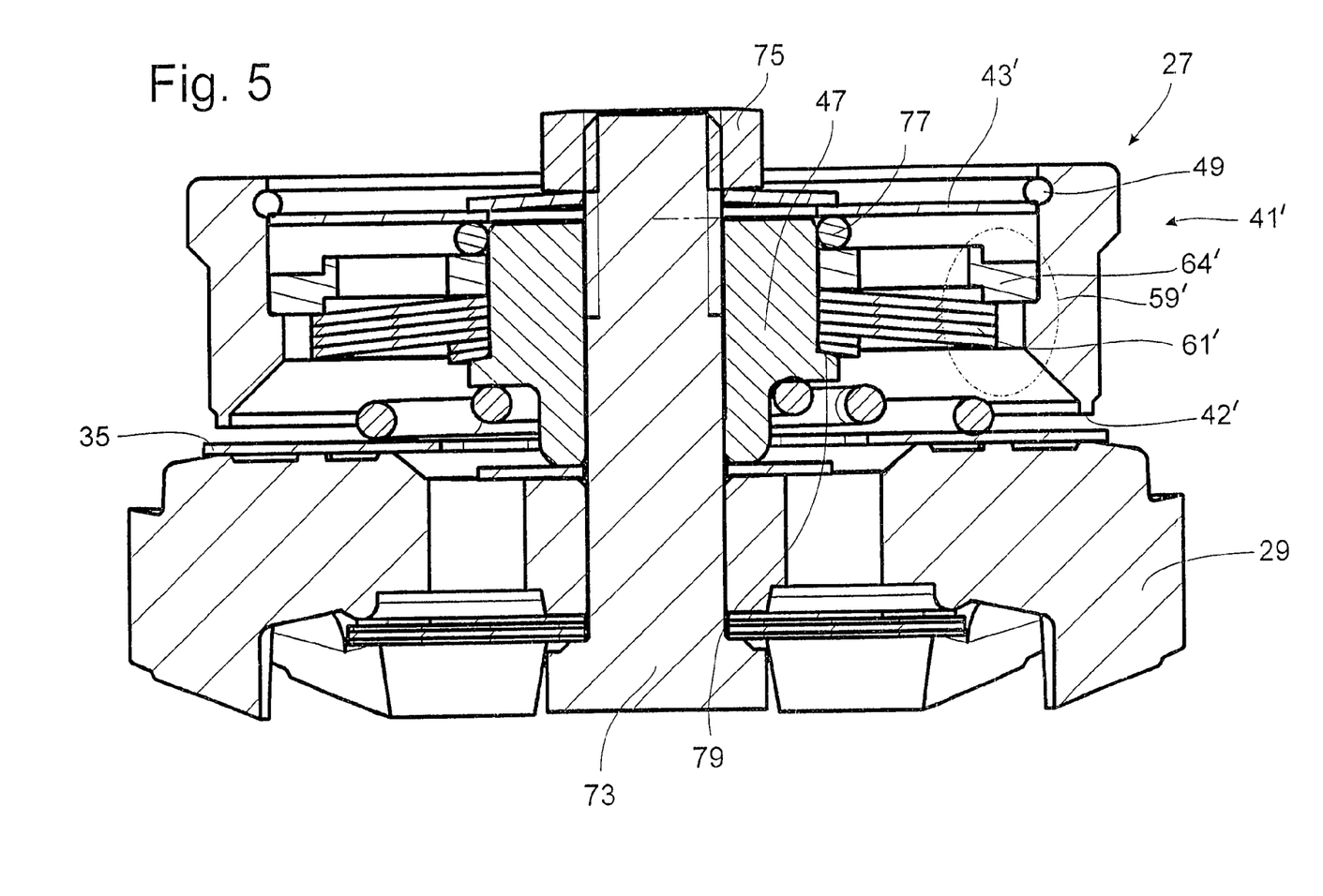
FIG. 5 shows a control slide with an independently pretensioned pressure-limiting valve.

FIG. 5 shows an elaboration of the bottom valve 27 of FIG. 1, in which the pretension of the cover disks 61' of the pressure-limiting valve 59' is independent of the spring 43', which holds the control slide 41' in the open position. The spring 43' is designed as a disk spring, the inside diameter area of which is held in place with respect to the valve body 29 between a bolt 73 and a tensioning nut 75. Alternatively, a riveted connection according to FIG. 1 could also be used. The disk spring 43' is on the bottom surface of the lock ring 49. The support body 47 serves as a support for the cover disks 61, onto which a valve disk 64, which is independent of the control slide, is pretensioned. A thrust ring 77 ensures that there is an unbroken chain for the clamping force, this chain starting from the support surface 79 of the support body and proceeding via the cover disks 61', the valve disk 64', the thrust ring 77, and the spring 43' to the clamping nut 75. The control slide 41' is supported axially in the open position against the bottom surface of the valve disk 64', where the pretensioning force is generated by the spring 43'. Overall, the control slide is thus supported with freedom to slide with respect to the cover disks between the blocking position, in which the end surface 42' rests against the disk 35, and the open position, in which the control slide rests axially against the bottom surface of the valve disk 64'. Because the pretension of the cover disks 61' does not act on the control slide, the operating behavior of the control slide is not affected in any way by the lifting of the cover disks 61' from the valve disk 64'.

Figure 6:
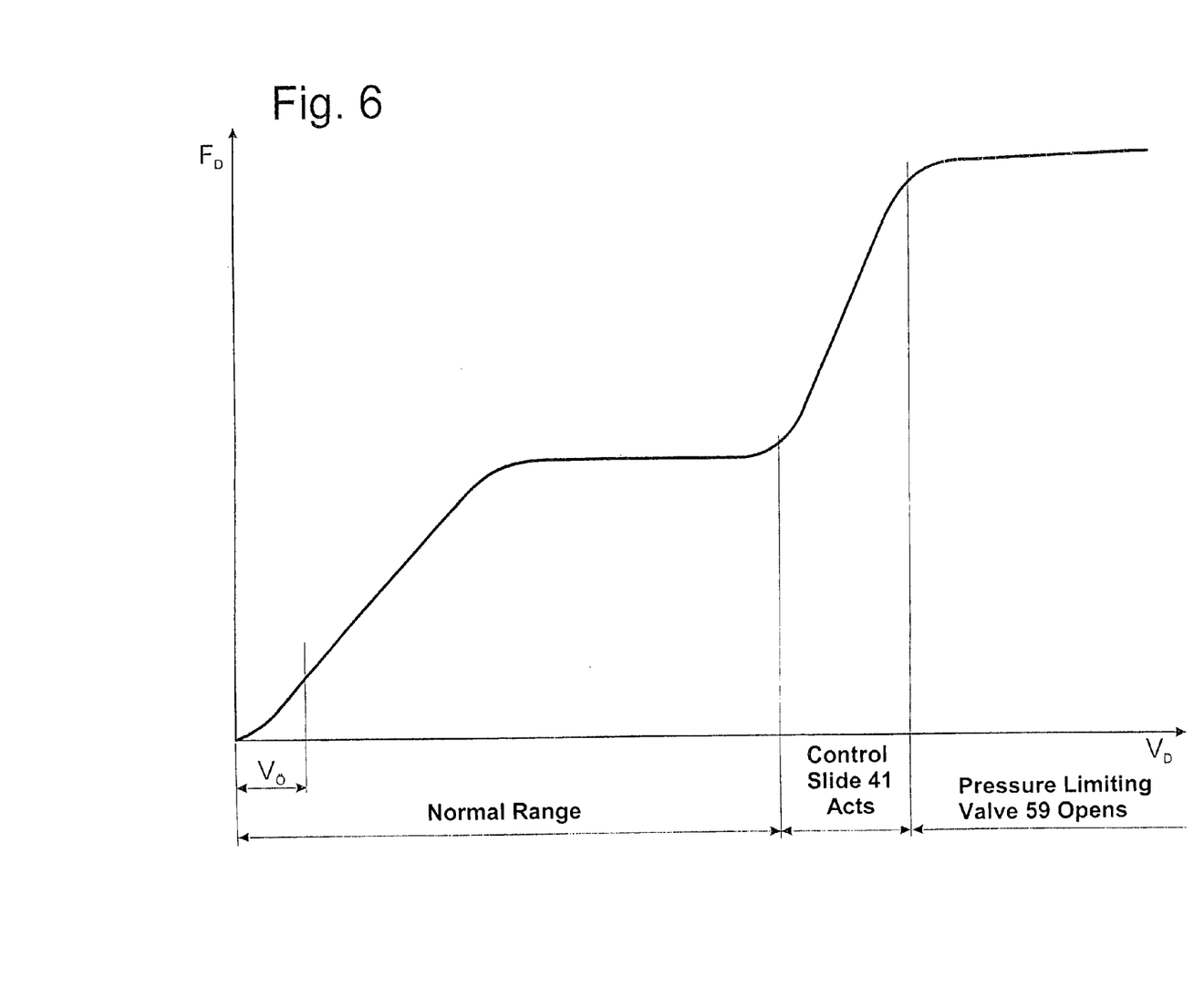
FIG. 6 shows the damping force characteristic of the inventive damping valve.

FIG. 6 shows the course of the damping force characteristic (damping force=$F_D$, flow velocity=$V_D$) of the inventive damping valve. At low flow velocities, only the pilot cross section, which is located in the valve seating surface for the valve disk 17, for example, and is always open in many damping valve designs, is active. Depending on the direction in which the piston is moving, one or the other of the valve disks or valve bodies on the piston or in the bottom valve 27 will rise when the damping force reaches a certain level. In many cases, a more-or-less linear or degressive course of the characteristic curve is desired in the normal operating range of the vibration damper here. At extreme flow velocities in the damping valves, e.g., during a very rapid inward movement of the vibration damper, the control slide causes the damping force to increase significantly, and when the damping force reaches a certain defined level, the pressure-limiting valve 59 opens.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A damping valve assembly for a vibration damper having a cylinder with an inside wall and a piston rod carrying a piston which moves in a damping medium in the cylinder, said assembly comprising:
    a first damping valve which, opens as the flow velocity of the damping medium in a first direction through said damping valve assembly increases;
    a first control slide which, with a progressive damping characteristic, can move in a closing direction to close a throttle, said control slide having a pressure-actuated surface which acts in the closing direction as a function of the flow velocity of the damping medium in the first direction through said damping valve assembly, the first damping valve and the first control slide being mounted on the piston;
    a piston nut, which fixes the piston to the piston rod, the control slide being supported against the piston nut;
    a spring which urges the control slide toward an open position and a spring carrier which carries the spring, said piston nut clamping the spring carrier and the control slide together to form a single structural unit; and
    a support ring, which supports the control slide axially,
    wherein the support ring is connected to the piston nut in a torque-transmitting manner, at least one of said support ring and piston nut having flats for engagement by a wrench.

2. The damping valve assembly of claim 1 wherein a second damping valve is a bottom valve which is fixed to said cylinder.

3. A damping valve assembly for a vibration damper having a cylinder with an inside wall and a piston rod carrying a piston which moves in a damping medium in the cylinder, said assembly comprising:
    a first damping valve which opens as the flow velocity of the damping medium increases; and
    a first control slide which, having a progressive damping characteristic, can move in a closing direction to close a throttle, said control slide having a pressure-actuated surface which acts in the closing direction as a function of the flow velocity of the damping medium, the first damping valve and the first control slide being mounted on the piston;
    a bottom valve which is fixed to said cylinder, said bottom valve comprising:
    a second damping valve which opens as the flow velocity of the damping medium increases; and
    a second control slide which, with a progressive damping characteristic, can move in a closing direction to close a further throttle, said second control slide having a second pressure-actuated surface which acts in the closing direction as a function of the flow velocity of the damping medium;

wherein the second control slide assumes a closed position at a slower flow velocity than the first control slide.

4. The damping valve assembly of claim 1 wherein the control slide has a plastically deformable adjusting area.

5. The damping valve assembly of claim 4 wherein the control slide has a wall thickness which is reduced in the adjusting area.

6. A damping valve assembly for a vibration damper having a cylinder with an inside wall and a piston rod carrying a piston which moves in a damping medium in the cylinder, said assembly comprising:
- a first damping valve which, opens as the flow velocity of the damping medium in a first direction through said damping valve assembly increases; and
- a first control slide which, progressive damping characteristic, can move in a closing direction to close a throttle, said control slide having a pressure-actuated surface which acts in the closing direction as a function of the flow velocity of the damping medium in the first direction through said damping valve assembly, wherein said second operating range is different from said first operating range, wherein the first damping valve comprises a valve body and a first valve spring which pretensions the valve body toward a closed position, said valve assembly further comprising a second spring which urges the control slide toward an open position, said second valve spring operating independently of said first valve spring, and
wherein the first valve spring holds the control slide in place on the damping valve.

7. A damping valve assembly for a vibration damper having a cylinder with an inside wall and a piston rod carrying a piston which moves in a damping medium in the cylinder, said assembly comprising:
- a first damping valve which, opens as the flow velocity of the damping medium in a first direction through said damping valve assembly increases;
- a first control slide which, having a progressive damping characteristic, can move in a closing direction to close a throttle said control slide having a pressure-actuated surface which acts in the closing direction as a function of the flow velocity of the damping medium in the first direction through said damping valve assembly, wherein said second operating range is different from said first operating range wherein the first damping valve and the first control slide are mounted on the piston; and
- a bottom valve which is fixed to said cylinder, said bottom valve comprising:
   - a second damping valve which opens as the flow velocity of the damping medium increases; and
   - a second control slide which, having a progressive damping characteristic, can move in a closing direction to close a further throttle, said second control slide having a second pressure-actuated surface which acts in the closing direction as a function of the flow velocity of the damping medium,
wherein the second control slide assumes a closed position at a slower flow velocity than the first control slide.

* * * * *